Figure 1:
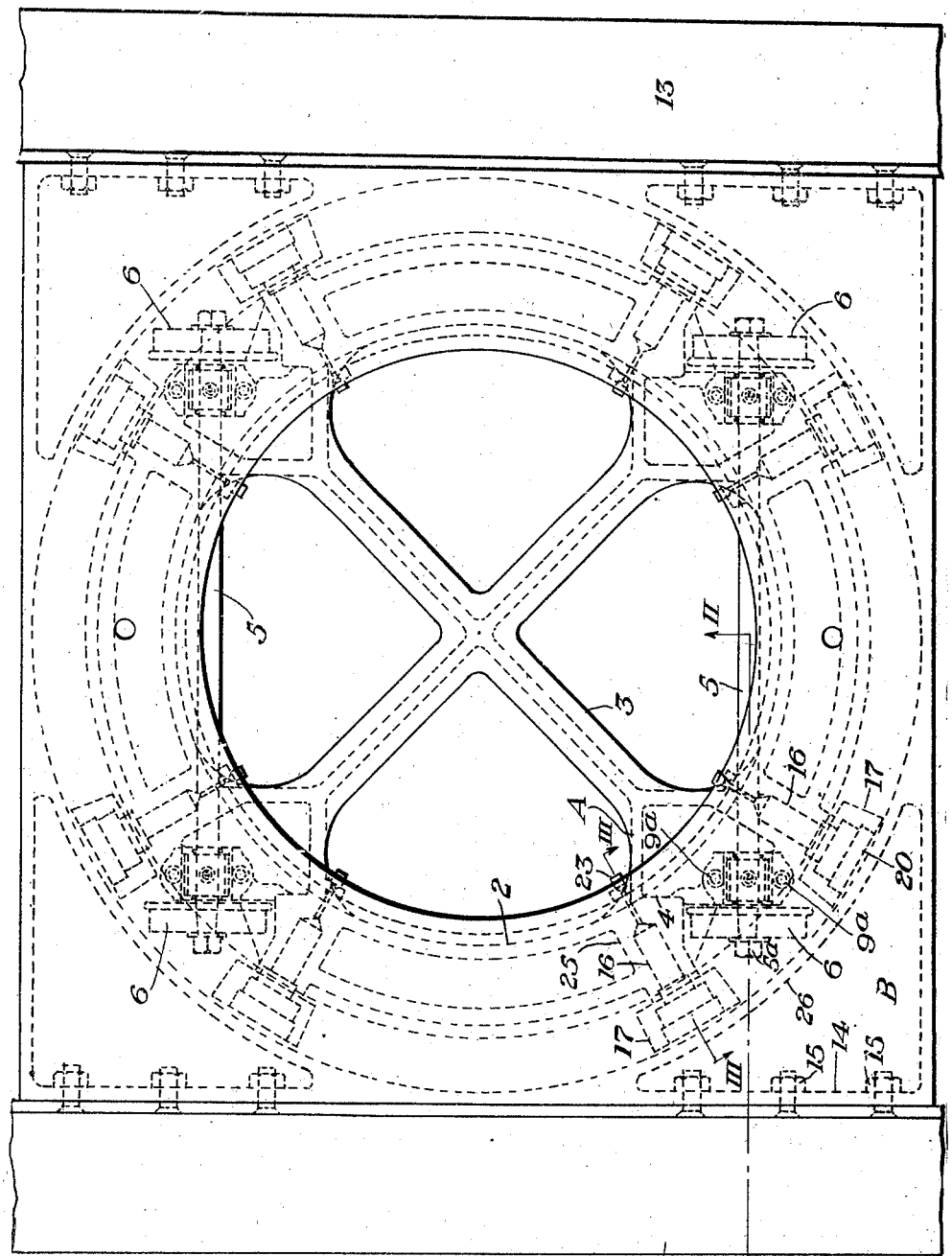

Feb. 17, 1925.
R. O. DIFFENDERFER ET AL
1,526,841
AUTOMOBILE TURNTABLE
Filed Aug. 31, 1923  2 Sheets-Sheet 2
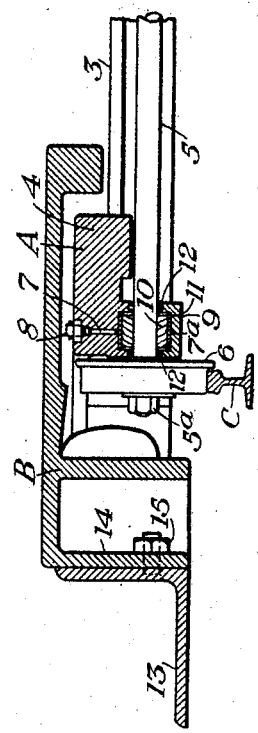
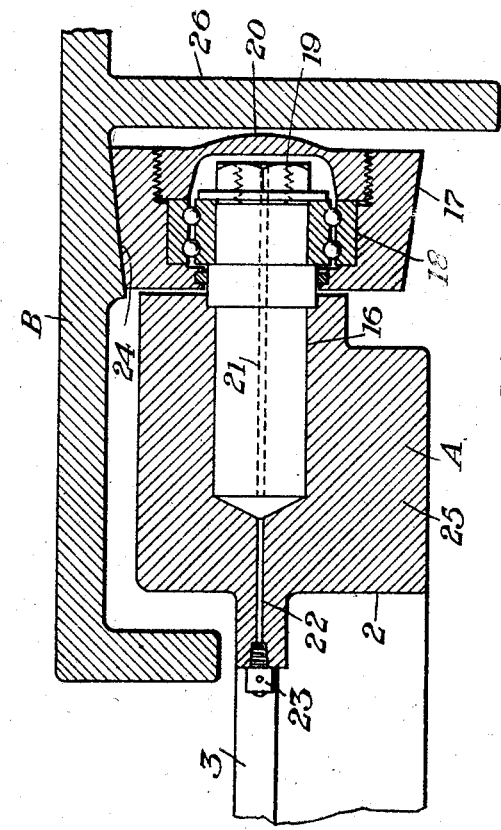
INVENTORS:
R. O. Diffenderfer,
C. T. Allme.
by A. L. Vencill
Their Attorney.

Patented Feb. 17, 1925.

1,526,841

UNITED STATES PATENT OFFICE.

ROY O. DIFFENDERFER AND CARL T. ALLME, OF BUTLER, PENNSYLVANIA, ASSIGNORS, BY MESNE ASSIGNMENTS, TO AUTO TURN COMPANY, OF CLARION, PENNSYLVANIA, A CORPORATION OF PENNSYLVANIA.

AUTOMOBILE TURNTABLE.

Application filed August 31, 1923. Serial No. 660,375.

*To all whom it may concern:*

Be it known that we, ROY O. DIFFENDERFER and CARL T. ALLME, citizens of the United States, residing at Butler, in the county of Butler and State of Pennsylvania, have invented certain new and useful Improvements in Automobile Turntables, of which the following is a specification.

Our invention relates to automobile turntables of the traveling type, and particularly to turntables of this type which comprise a truck having mobility wheels and a turret mounted to revolve on the truck and provided with means for supporting an automobile.

One feature of our invention is the provision of novel and improved means for mounting the mobility wheels on the truck and for lubricating the bearing between the wheels and the truck. Another feature of our invention is the provision of novel and improved means for mounting the turret on the truck and for lubricating the bearings between the two.

We will describe one form of turntable embodying our invention and will then point out the novel features thereof in claims.

In the accompanying drawings, Fig. 1 is a top plan view of a turntable embodying our invention; Fig. 2 is a sectional view on the line II—II of Fig. 1; and Fig. 3 is a sectional view on the line III—III of Fig. 1.

Similar reference characters refer to similar parts in each of the views.

Referring now to the drawings, the turntable comprises, in general, a truck A provided with mobility wheels 6, and a turret B mounted to revolve on the truck and provided with carriers 13 suitably spaced to support the wheels of an automobile.

The truck A comprises an annular or ring-like member 2 provided with spokes 3. The annular member 2 is enlarged at four points to provide bosses 4 in which the mobility wheels 6 are journaled. As here shown, these mobility wheels are fixed to the ends of axles 5 by nuts 5ª, and the axles 5 are in turn mounted in the bosses 4 by means of roller bearings comprising rollers 10. These rollers 10 operate in a cage 11, which is held in place by a cap 9 attached to the boss 4 by means of bolts 9ª. Lubrication of the rollers 10 is accomplished by a duct 7 in the boss 4, the lower end of which duct terminates in a groove 7ª surrounding the cage 11. This cage is in turn provided with holes to admit the lubricant from the groove 7ª to the rollers 10. The upper end of the duct 7 terminates in an opening on the upper surface of the boss 4, which opening is threaded to receive a threaded cap 8. By coupling a grease or oil gun to the cap 8 lubricant can be injected in the duct 7 under pressure. This cap and gun may, for examples, be of the types used in the system known as Alemite lubrication. Retaining rings 12 are provided to prevent lubricant from escaping from the cage 11 along axle 5.

As here shown, the wheels 6 are designed to effect the mobility of the turntable as a whole along a suitable track C, but it is obvious that, if desired, the flanges may be omitted from these wheels, so that they are suitable for rolling along a plane surface, such as the floor of the garage.

Referring now specifically to Figs. 1 and 3, the turret B is rectangular and is provided with an annular runway 24 co-acting with rollers 17 which are mounted on the truck A. As here shown, the annular ring 2 is provided with bosses 25, each of which is recessed to receive a stud 16. Each stud projects radially from the outer periphery of the ring and the projecting portion carries a ball bearing 18 which is attached to the stud by a nut 19. The roller 17 is mounted to revolve freely on the ball bearing 18. The periphery of each roller 17 is conical with the larger diameter at the outer end and the annular runway 24 is beveled, as shown in Fig. 3, to make a line contact at all times with the periphery of the roller. It will be seen, therefore, that the turret B is centered in part at least by the conical shapes of the rollers; that is to say, any tendency of the turret to move radially with respect to the truck is opposed by gravity, because such movement would necessitate upward vertical movement of the turret on at least one of the rollers.

The centering of the turret with respect to the truck is further effected by a circular flange 26 projecting downwardly from the body of the turret, which flange co-operates with a cap 20 screwed into a suitable recess in the outer face of each roller 17. When the turret is properly centered there is a small amount of clearance between each cap 20 and the flange 26, but in the event of any radial displacement of the turret B the flange 26 will engage the cap of at least one roller and will thereby prevent further radial displacement of the turret.

The lubrication of each roller bearing 18 is accomplished by a duct 21 passing through the associated stud 16 and the nut 19 to the bearing 18, and by a second duct 22 passing through the boss 25 from the inner end of the stud 21 to the inner surface of the ring 2. The inner end of the duct 22 terminates in a threaded opening adapted to receive a cap 23. By coupling a grease or oil gun to this cap lubricant can be injected under pressure into the ducts 22 and 21, and so into the bearing 18. The gun and cap may, for examples, be of the types used in what is known as the Alemite system of lubrication.

The carriers 13, as here shown, are in the form of angle bars which are attached to flange 14 on turret B by means of bolts 15.

The manner in which turntables of the type disclosed herein are used in garages is so well understood that no further explanation is required.

Although we have herein shown and described only one form of turntable embodying our invention, it is understood that various changes and modifications may be made therein within the scope of the appended claims without departing from the spirit and scope of our invention.

Having thus described our invention, what we claim is:

1. An automobile turntable comprising a truck, studs projecting radially from said truck, rollers mounted on said studs, and a turret revolubly supported by said rollers.

2. An automobile turntable comprising a truck, studs projecting radially from said truck, a roller mounted to revolve on the projecting portion of each stud, and a turret supported solely by said rollers and rotatable thereon.

3. An automobile turntable comprising a truck, studs projecting radially from said truck, rollers mounted on said studs, and a turret revolubly supported by said rollers and also restrained from horizontal displacement by said rollers.

4. An automobile turntable comprising a truck, studs projecting radially from said truck, rollers mounted on said studs, and a turret revolubly supported and centered with respect to the truck by said rollers.

5. An automobile turntable comprising a truck, studs projecting radially from said truck, rollers mounted on said studs, and a turret having an annular runway coacting with the peripheries of said rollers and a circular flange co-acting with the outer ends of said rollers to center the turret with respect to the truck.

6. An automobile turntable comprising a truck, rollers mounted thereon with their axes horizontal, and a turret having an annular runway co-acting with the peripheries of said rollers and a circular flange co-acting with the outer ends of said rollers to center the turret with respect to the truck.

7. An automobile turntable comprising a truck, rollers mounted thereon in ring formation, the periphery of each roller being conical with the larger diameter at the outer end, and a turret revolubly supported by said rollers and normally free from other connection with said truck whereby the turret is normally centered with respect to the truck by the conical shapes of said rollers.

8. An automobile turntable comprising a truck, rollers mounted thereon in ring formation, the periphery of each roller being conical with the larger diameter at the outer end, and a turret revolubly supported by said rollers and centered with respect to said truck in part by the conical shapes of the rollers and in part by the outer ends of the rollers.

9. An automobile turntable comprising a truck, rollers mounted thereon in ring formation, the periphery of each roller being conical with the larger diameter at the outer end, and a turret having a circular runway co-acting with the peripheries of said rollers and a circular flange co-acting with the outer ends of said rollers.

10. An automobile turntable comprising a truck, studs projecting radially from said truck, rollers mounted on said studs, the periphery of each roller being conical with the larger diameter at the outer end, and a turret having a circular runway co-acting with the peripheries of said rollers and a circular flange co-acting with the outer ends of said rollers.

11. An automobile turntable comprising a truck, studs projecting radially from said truck, a roller on each stud, and a ball bearing between each stud and the associated roller.

12. An automobile turntable comprising a truck, studs projecting radially from said truck, a roller on each stud, a ball bearing between each stud and the associated roller, and means for injecting lubricant under pressure into each ball bearing.

13. An automobile turntable comprising a truck having a horizontally disposed annular ring provided with recesses in its outer surface, a stud located in each recess and projecting radially from the ring, a turret-supporting roller mounted to revolve on the projecting end of each stud, a ball bearing interposed between each stud and the associated roller, a lubrication duct in each stud leading from the ball bearing to the inner end of the stud, and a lubrication duct leading from the inner end of each stud to a surface of said ring.

14. An automobile turntable comprising a truck having a horizontally disposed annular ring provided with recesses in its outer surface, a stud located in each recess and projecting radially from the ring, a turret-supporting roller mounted to revolve on the projecting end of each stud, a lubrication duct in each stud leading from the bearing end to the inner end of the stud, and a lubrication duct leading from the inner end of each stud to a surface of said ring.

15. An automobile turntable comprising a truck having a horizontally disposed annular ring provided with recesses in its outer surface, a stud located in each recess and projecting radially from the ring, a turret-supporting roller mounted to revolve on the projecting end of each stud, and a lubrication duct leading from the bearing end of each stud through the stud and the ring to a surface of the ring.

16. An automobile turntable comprising a truck having a horizontally disposed annular ring provided with recesses in its outer surface, a stud located in each recess and projecting radially from the ring, a turret-supporting roller mounted to revolve on the projecting end of each stud, a lubrication duct leading from the bearing end of each stud through the stud and the ring to a surface of the ring, and a cap at the surface of the ring for injecting lubricant in the duct and bearing under pressure.

In testimony whereof we affix our signatures.

ROY O. DIFFENDERFER.
CARL T. ALLME.